United States Patent
Graham

(10) Patent No.: US 10,750,730 B2
(45) Date of Patent: Aug. 25, 2020

(54) FLARED DOUBLE FISH HOOK

(71) Applicant: Graham Tackle, LLC, Homestead, FL (US)

(72) Inventor: Michael Gregory Graham, Homestead, FL (US)

(73) Assignee: Graham Tackle LLC, Homestead, FL (US)

( * ) Notice: Subject to any disclaimer, the term of this patent is extended or adjusted under 35 U.S.C. 154(b) by 521 days.

(21) Appl. No.: 15/398,953

(22) Filed: Jan. 5, 2017

(65) Prior Publication Data

US 2017/0188560 A1 Jul. 6, 2017

Related U.S. Application Data

(60) Provisional application No. 62/274,959, filed on Jan. 5, 2016, provisional application No. 62/293,156, filed on Feb. 9, 2016.

(51) Int. Cl.
| | | |
|---|---|---|
| *A01K 83/00* | (2006.01) |
| *A01K 83/04* | (2006.01) |
| *A01K 85/01* | (2006.01) |
| *B21F 45/12* | (2006.01) |

(52) U.S. Cl.
CPC .............. *A01K 83/00* (2013.01); *A01K 83/04* (2013.01); *A01K 85/01* (2013.01); *B21F 45/12* (2013.01)

(58) Field of Classification Search
CPC ......... A01K 83/00; A01K 83/06; A01K 83/04
USPC ..... 43/43.16, 44.82, 44.2, 44.8, 42.1, 42.41, 43/42.35; D22/144
See application file for complete search history.

(56) References Cited

U.S. PATENT DOCUMENTS

| 440,721 | A | * | 11/1890 | Provoost | A01K 83/06 43/44.8 |
|---|---|---|---|---|---|
| 471,548 | A | * | 3/1892 | Haviland | A01K 83/00 43/44.82 |
| 533,652 | A | * | 2/1895 | Kittle | A01K 83/06 43/44.4 |
| 699,397 | A | * | 5/1902 | Lacey | A01K 83/00 43/43.16 |
| 754,349 | A | * | 3/1904 | Scott | A01K 83/06 43/44.6 |
| 772,333 | A | * | 10/1904 | Biersach | A01K 83/00 43/43.16 |
| 788,201 | A | * | 4/1905 | Friend | A01K 83/00 43/44.82 |

(Continued)

FOREIGN PATENT DOCUMENTS

| CA | 1211933 A | * | 9/1986 | ............. A01K 83/00 |
| CA | 1266778 A | * | 3/1990 | ............. A01K 83/04 |

(Continued)

OTHER PUBLICATIONS

Translation of DE 10230048 (Year: 2003).*

*Primary Examiner* — Darren W Ark
(74) *Attorney, Agent, or Firm* — Boulware & Valoir

(57) ABSTRACT

A flared double fish hook having a pair of shanks, said pair of shanks adjacent one another up to a bifurcation point; the shanks bifurcating at said bifurcation point to each form a bend ending in a point; the shanks being separated by an first angle at the bifurcation point, and a second larger angle at the points, such that the bend portion of the double fish hook flares.

17 Claims, 4 Drawing Sheets

(56) References Cited

U.S. PATENT DOCUMENTS

| | | | | |
|---|---|---|---|---|
| 828,505 A * | 8/1906 | Rice | A01K 83/00 | 43/43.16 |
| 831,552 A * | 9/1906 | Hallstrom | A01K 83/00 | 43/43.6 |
| 842,594 A * | 1/1907 | Van Vleck et al. | A01K 83/00 | 43/43.16 |
| 890,549 A * | 6/1908 | Zamel | A01K 85/02 | 43/42.1 |
| 1,283,718 A * | 11/1918 | Ford | A01K 83/00 | 43/44.82 |
| 1,334,839 A * | 3/1920 | Cole | A01K 83/00 | 294/66.1 |
| 1,357,678 A * | 11/1920 | Bain | A01K 83/00 | 43/44.81 |
| 1,437,694 A * | 12/1922 | Traver | A01K 85/02 | 43/35 |
| 1,448,735 A * | 3/1923 | Edmondson | A01K 83/02 | 43/36 |
| 1,623,870 A * | 4/1927 | Goodgame | A01K 83/02 | 43/36 |
| 1,875,182 A * | 8/1932 | Southwell | A01K 83/00 | 43/44.82 |
| 2,012,786 A * | 8/1935 | Hoage | A01K 83/06 | 43/44.4 |
| 2,208,069 A * | 7/1940 | Broz | A01K 83/00 | 43/44.82 |
| 2,233,863 A * | 3/1941 | Driscoll | A01K 83/00 | 43/43.16 |
| 2,317,900 A * | 4/1943 | Freeman | A01K 83/00 | 43/44.82 |
| 2,334,613 A * | 11/1943 | Dunkelberger | A01K 83/00 | 43/44.82 |
| 2,345,197 A * | 3/1944 | Hirsch | A01K 83/00 | 43/44.82 |
| 2,501,085 A * | 3/1950 | Pape | A01K 83/06 | 43/44.4 |
| 2,534,469 A * | 12/1950 | Moore | A01K 83/06 | 43/44.8 |
| 2,575,139 A * | 11/1951 | Smith | A01K 85/16 | 43/42.33 |
| 2,598,011 A * | 5/1952 | Pitre | A01K 83/06 | 43/44.8 |
| 2,605,579 A * | 8/1952 | Chadwick | A01K 83/06 | 43/44.4 |
| 2,608,791 A * | 9/1952 | Wentz | A01K 83/00 | 43/43.16 |
| 2,624,146 A * | 1/1953 | Kahle | A01K 83/00 | 43/43.16 |
| 2,800,740 A * | 7/1957 | Glaze | A01K 83/00 | 43/44.82 |
| 2,854,779 A * | 10/1958 | Jackson | A01K 85/02 | 43/37 |
| 3,121,969 A * | 2/1964 | Cuttino | A01K 85/02 | 43/42.1 |
| 3,289,346 A * | 12/1966 | Ehling | A01K 83/06 | 43/44.6 |
| 3,400,483 A * | 9/1968 | Temple | A01K 83/06 | 43/44.6 |
| 3,600,838 A * | 8/1971 | Bablick | A01K 83/06 | 43/43.6 |
| 3,670,446 A | 6/1972 | Wheeler | | |
| 3,683,541 A * | 8/1972 | Cather | A01K 83/00 | 43/43.4 |
| 3,722,128 A * | 3/1973 | Tremblay | A01K 83/00 | 43/42.1 |
| 3,861,073 A * | 1/1975 | Thomassin | A01K 85/16 | 43/42.1 |
| 3,890,735 A * | 6/1975 | Serrill | A01K 83/02 | 43/36 |
| 4,471,558 A * | 9/1984 | Garcia | A01K 83/06 | 43/44.4 |
| 4,570,373 A * | 2/1986 | Brief | A01K 83/00 | 43/43.16 |
| 4,750,290 A * | 6/1988 | Renaud | A01K 85/00 | 43/42.11 |
| D297,253 S * | 8/1988 | Pride | D22/144 | |
| 4,893,431 A * | 1/1990 | Ehlers | A01K 85/02 | 43/42.35 |
| 4,905,402 A * | 3/1990 | Clark | A01K 83/00 | 43/43.16 |
| 4,953,321 A * | 9/1990 | Furuta | A01K 83/00 | 43/43.16 |
| 4,961,279 A * | 10/1990 | Hanson | A01K 83/06 | 43/43.16 |
| 4,965,957 A * | 10/1990 | Hnizdor | A01K 83/00 | 43/44.82 |
| 4,998,373 A * | 3/1991 | Braswell | A01K 85/00 | 43/42.37 |
| 5,115,594 A * | 5/1992 | Gowing | A01K 83/00 | 43/44.82 |
| 5,265,370 A * | 11/1993 | Wold | A01K 83/00 | 43/43.16 |
| 5,425,195 A * | 6/1995 | Nakamichi | A01K 83/00 | 43/44.82 |
| 5,491,925 A * | 2/1996 | Carpenter | A01K 83/02 | 43/35 |
| 5,564,216 A * | 10/1996 | McMillan | A01K 83/02 | 43/35 |
| 5,579,600 A * | 12/1996 | Burns | A01K 83/00 | 43/43.16 |
| 5,628,140 A * | 5/1997 | Hnizdor | A01K 83/00 | 43/42.25 |
| 5,641,543 A | 6/1997 | Brooks | | |
| 5,673,508 A * | 10/1997 | Snyder | A01K 83/00 | 43/42.37 |
| 5,845,429 A * | 12/1998 | Battaglia | A01K 83/00 | 43/43.16 |
| 5,875,584 A * | 3/1999 | Gowing | A01K 83/00 | 43/44.82 |
| 5,901,493 A * | 5/1999 | Tolliver | A01K 83/00 | 43/43.16 |
| 5,946,846 A * | 9/1999 | Cotton | A01K 83/02 | 43/36 |
| 6,038,806 A * | 3/2000 | Maitland | A01K 83/06 | 43/4.5 |
| 6,141,900 A * | 11/2000 | Rudolph | A01K 83/06 | 43/42.24 |
| 6,253,485 B1 | 7/2001 | Jilling et al. | | |
| 6,282,831 B1 * | 9/2001 | Hugunin | A01K 83/06 | 43/4.5 |
| 6,516,552 B2 * | 2/2003 | Hawkins | A01K 85/00 | 43/42.09 |
| 6,634,135 B1 * | 10/2003 | Rydell | A01K 83/00 | 43/42.1 |
| D522,087 S * | 5/2006 | Larsen | D22/144 | |
| 7,140,146 B2 * | 11/2006 | Gill | A01K 83/06 | 43/42.39 |
| 7,370,450 B2 * | 5/2008 | Roos | A01K 83/00 | 43/35 |
| 7,424,786 B1 * | 9/2008 | Nelson | A01K 83/00 | 43/42.39 |
| 7,493,725 B2 * | 2/2009 | Sampson | A01K 85/16 | 43/42.24 |
| 7,637,050 B2 * | 12/2009 | Brick | A01K 85/16 | 43/42.09 |
| 7,673,414 B1 * | 3/2010 | Ivey | A01K 83/00 | 43/4.5 |
| 8,893,427 B2 * | 11/2014 | Sugano | A01K 83/00 | 29/9 |
| 9,078,421 B1 * | 7/2015 | Rye | A01K 85/10 | |
| 9,572,329 B2 * | 2/2017 | Hopkins | A01K 83/00 | |
| 9,572,330 B2 * | 2/2017 | White | A01K 83/00 | |
| 9,622,463 B2 * | 4/2017 | Thompson | A01K 85/16 | |
| 9,723,821 B2 * | 8/2017 | Muntz | A01K 91/02 | |
| 9,737,060 B1 * | 8/2017 | Racho | A01K 83/00 | |
| D839,381 S * | 1/2019 | Quiles | D22/136 | |

(56) References Cited

U.S. PATENT DOCUMENTS

| | | | |
|---|---|---|---|
| 2002/0050092 A1* | 5/2002 | Hugunin | A01K 83/06 43/43.16 |
| 2003/0182844 A1* | 10/2003 | Berthold | A01K 83/00 43/44.83 |
| 2004/0003533 A1* | 1/2004 | Larsen | A01K 83/00 43/44.82 |
| 2008/0047192 A1* | 2/2008 | Bennis | A01K 83/00 43/44.8 |
| 2008/0066370 A1 | 3/2008 | Wichern | |
| 2008/0083154 A1* | 4/2008 | Gregory | A01K 83/00 43/44.8 |
| 2011/0056114 A1* | 3/2011 | Capeski | A01K 83/00 43/43.16 |
| 2013/0025179 A1* | 1/2013 | Tsutsumi | A01K 83/00 43/17.5 |
| 2013/0239459 A1* | 9/2013 | Rosenberg | A01K 83/06 43/44.2 |
| 2014/0041279 A1* | 2/2014 | Dalton | A01K 83/06 43/4.5 |
| 2014/0290120 A1* | 10/2014 | Kinna | A01K 83/00 43/43.16 |
| 2014/0373428 A1* | 12/2014 | Sanders | A01K 83/00 43/42.36 |
| 2016/0106081 A1* | 4/2016 | Thorne | A01K 85/18 43/42.39 |
| 2017/0251648 A1* | 9/2017 | Hidaka | C23C 22/05 |

FOREIGN PATENT DOCUMENTS

| | | | | |
|---|---|---|---|---|
| CA | 2011255 C | * | 10/2002 | A01K 83/00 |
| CA | 2571422 A1 | * | 7/2007 | A01K 83/00 |
| CA | 2774410 C | * | 9/2013 | A01K 83/00 |
| CA | 2826808 C | * | 12/2014 | A01K 83/00 |
| DE | 3224492 A1 | * | 12/1983 | A01K 83/06 |
| DE | 19944945 A1 | * | 4/2001 | A01K 83/00 |
| DE | 10230048 A1 | * | 1/2003 | A01K 83/00 |
| EP | 127567 A1 | * | 12/1984 | |
| FR | 392815 A | * | 12/1908 | A01K 83/06 |
| FR | 749308 A | * | 7/1933 | A01K 83/06 |
| FR | 916121 A | * | 11/1946 | A01K 83/06 |
| FR | 2481066 A1 | * | 10/1981 | A01K 83/00 |
| FR | 2914144 A1 | * | 10/2008 | A01K 83/00 |
| GB | 190816438 A | * | 9/1908 | A01K 83/06 |
| GB | 191415415 A | * | 2/1915 | A01K 83/00 |
| GB | 292372 A | * | 6/1928 | A01K 83/00 |
| GB | 362821 A | * | 12/1931 | A01K 83/00 |
| GB | 615032 A | * | 12/1948 | A01K 83/00 |
| GB | 2185171 A | * | 7/1987 | A01K 83/00 |
| GB | 2304513 A | * | 3/1997 | A01K 83/00 |
| GB | 2472419 A | * | 2/2011 | A01K 83/00 |
| JP | 02203728 A | * | 8/1990 | A01K 83/00 |
| JP | 05123084 A | * | 5/1993 | |
| JP | 06113699 A | * | 4/1994 | |
| JP | 06253707 A | * | 9/1994 | |
| JP | 7015412 Y2 | * | 4/1995 | |
| JP | 08056534 A | * | 3/1996 | |
| JP | 09094044 A | * | 4/1997 | |
| JP | 09135650 A | * | 5/1997 | |
| JP | 10276616 A | * | 10/1998 | |
| JP | 11075621 A | * | 3/1999 | |
| JP | 11127729 A | * | 5/1999 | |
| JP | 3052081 B1 | * | 6/2000 | |
| JP | 2000189001 A | * | 7/2000 | |
| JP | 3111113 B2 | * | 11/2000 | |
| JP | 2000342111 A | * | 12/2000 | |
| JP | 2001054340 A | * | 2/2001 | |
| JP | 2001299148 A | * | 10/2001 | |
| JP | 3301675 B2 | * | 7/2002 | |
| JP | 2002223668 A | * | 8/2002 | |
| JP | 2003134968 A | * | 5/2003 | |
| JP | 2003166088 A | * | 6/2003 | |
| JP | 2003180200 A | * | 7/2003 | |
| JP | 3484102 B2 | * | 1/2004 | |
| JP | 3600281 B2 | * | 12/2004 | |
| JP | 2005168375 A | * | 6/2005 | |
| JP | 3737737 B2 | * | 1/2006 | |
| JP | 3960992 B2 | * | 8/2007 | |
| JP | 2009201393 A | * | 9/2009 | |
| JP | 2009213396 A | * | 9/2009 | |
| JP | 2011050371 A | * | 3/2011 | |
| JP | 2011152083 A | * | 8/2011 | |
| JP | 2013150564 A | * | 8/2013 | |
| JP | 5501016 B2 | * | 5/2014 | A01K 83/00 |
| JP | 2017147942 A | * | 8/2017 | A01K 85/02 |
| KR | 20060048317 A | * | 5/2006 | |
| KR | 100820867 B1 | * | 4/2008 | |
| KR | 100878501 B1 | * | 1/2009 | |
| KR | 100985245 B1 | * | 10/2010 | |
| KR | 20110059342 A | * | 6/2011 | |
| KR | 20130111820 A | * | 10/2013 | |
| KR | 20140041202 A | * | 4/2014 | |
| WO | WO-03077647 A1 | * | 9/2003 | A01K 83/00 |
| WO | WO-2005018318 A1 | * | 3/2005 | A01K 83/00 |
| WO | WO-2009097658 A1 | * | 8/2009 | A01K 83/00 |
| WO | WO-2011007373 A1 | * | 1/2011 | A01K 83/00 |

* cited by examiner

FLARED DOUBLE FISH HOOK

PRIOR RELATED APPLICATIONS

This application is related to 62/274,959, filed Jan. 5, 2016, and 62/293,156, filed Feb. 9, 2016. Each is incorporated by reference herein in its entirety for all purposes.

FIELD OF THE DISCLOSURE

This invention relates generally to fish hooks, in particular double fish hooks.

BACKGROUND OF THE DISCLOSURE

In 2011, archaeologists in the Jerimalai cave in East Timor discovered the world's oldest known fish hook—a shell hook between 16,000 and 23,000 years old. Thus, this essential tool has been in use for millenium to catch fish. Indeed, in 2005 the fish hook was chosen by Forbes as one of the top twenty tools in the history of mankind.

There are an enormous variety of fish hooks. Sizes, designs, shapes, and materials are all variable, depending on the intended purpose of the fish hook. Fish hooks are manufactured for a range of purposes from general fishing to extremely limited and specialized applications. Fish hooks are designed to hold various types of artificial, processed, dead or live baits (bait fishing); to act as the foundation for artificial representations of fish prey (fly fishing); or to be attached to or integrated into other devices that represent fish prey (lure fishing).

To easily discuss hooks, one should be familiar with the established nomenclature. The parts of a fish hook are: its point—the sharp end that penetrates the fish's mouth or flesh; the barb—the projection extending backwards from the point, that secures the fish from unhooking; the eye—the end of the hook that is connected to the fishing line or lure; the bend and shank—those portions of the hook that connects the point and the eye; and the gap—the distance between the shank and the point and the throat—the depth between the point and the bottom most portion of the bend. See e.g., FIG. 1.

Hooks are commonly designed as either single hooks—a single eye, shank and point; double hooks—a single eye merged with two shanks and two points; or triple hooks—a single eye merged with three shanks and three evenly spaced points. Double hooks are formed from a single piece of wire and may or may not have their shanks brazed together for strength. Triple hooks are typically formed by adding a single eyeless hook to a double hook and brazing all three shanks together. Double hooks are used on some artificial lures and are a traditional fly hook for Atlantic Salmon flies, but are otherwise fairly uncommon. Triple hooks are used on all sorts of artificial lures as well as for a wide variety of bait applications.

The hook point is probably the most important part of the hook. It is the point that must penetrate fish flesh and secure the fish. The profile of the hook point and its length influence how well the point penetrates. The barb influences how far the point penetrates, how much pressure is required to penetrate and ultimately the holding power of the hook. Historically, many ancient fish hooks were barbless, but today a barbless hook is used to make hook removal and fish release less stressful on the fish.

Hook sizing can be a bit confusing. Hook sizes with a number followed by a zero increase in size as the number goes up. For instance a 4/0, ("four bar oh or "four oh"), hook is one size up from a 3/0, which is one size up from a 2/0, etc. Hook sizes not followed by a zero, decrease in size as the number increases. For example a size 3 hook is smaller than a size 2 hook, which is smaller than a size 1 hook.

Hooks marked '2x strong' are made from wire as thick as the next size up. A 3x hook is as thick as a hook two sizes up. These hooks are designed to provide as much strength as a hook one or two sizes up, but are used where a smaller hook is required. Extra strength hooks are often used when live-baiting, to avoid having too much hook visible to the fish. They are also useful on lures, where using a bigger hook might kill the action of the lure and make it less attractive to fish. In both these scenarios the extra strength of the smaller hook equates to a larger size hook.

The other common x standard is the length of the hook shank. A '2x long' hook has a shank twice as long as the standard hook of the same size. A 3x long hook has a shank 3 times as long as the standard sized hook. 'X' long are hooks mostly found in fly-tying hooks.

The two most important dimensions of a hook are its gape, the distance between point and shank, and the depth of the throat. Generous dimensions ensure deeper penetration of the point and better holding power of the fish.

A less common, but important variant are 'wide gape' hooks. A wide gape hook is one where the gape (the gap between the hook point and hook shaft) is wider than the standard hook. Sometimes the wide gape hook is described as '2x wide', and the hook should have a gape twice as wide as the standard hook, or in some cases the same size gape as the next hook size up—but there is little standardization in this area, even amongst hooks from the same manufacturer.

Hooks come in around nine point variants and all are designed to achieve different objectives. See FIG. 2. A knife edge point is designed to cut into flesh and bone, and is useful for most 'hard' mouthed fish. But they do have the disadvantage of cutting in and out. A needle point hook is pretty much what it looks like, a needle. Needle points have good penetration, but not as good as knife edge hooks. However, needle points do not cut once in the fish's mouth and are less likely to cut their way out.

Barbless hooks are just that, and can be in any point variant. 'Micro' barbs are very small barbs that are mainly seen on small hooks for trout and coarse fishing. A 'short' barb hook is a barb nearer the hook point than on a standard hook.

A 'beak' hook is where the point of the hook curves up towards the shank, in front of the barb. 'Kirbed' or 'reversed' hook points are points that curve away at an angle to the shank. They are said to provide a better hook-up rate as the point does not get deflected by the shank. Most people call all hooks like this 'kirbed' hooks, but strictly speaking a kirbed hook point bends out to the right looking straight-on to the shaft, and the reversed hook point bends out to the left.

Standard hooks are made from wire that is bent into shape, then the point sharpened and barb added. The wire retains its round shape throughout the hook. To strengthen the metal, hook makers often cold-forge or compress saltwater hooks, and then they're tempered or heat-treated. This is the most crucial stage of hook making. The tempering molecularly alters the metal, concentrating the carbon and removing impurities. Forged hooks, once the shape has been made, have the sides of the shank and bend flattened which makes them much stronger than standard hooks, but a good deal more expensive. They are commonly used in big game fishing where hook strength is vital, but many trophy hunters and competition fishers use them in salt and fresh water fishing as well.

The eye of the hook can also vary. Common types of hook eyes are shown in FIG. 3, and include the ringed eye, brazed eye, tapered eye, looped eye, and the needle eye. As an alternative to the eye, a "spade end" or "flattened" hooks can be used, where the end of the shank is flattened, and the fishing line is snelled/tied directly to the shank of the hook. The flattened area stops the knot from sliding off the hook. The flattened eye is used for medium-sized species in commercial fishing. Where natural bait is used, a hook may possess no eye at all, but simply a flattened end. Spade end hooks are extensively used by match anglers.

In addition, the position of the eye can vary, depending on the shape or curvature of the shank. FIG. 4 shows common eye positions, which is an important factor when it comes to improving the hooking potential of artificial lures. "Straight" is the standard eye position. But other variants include the turned up eye, the turned down eye, and the parallel eye, which is parallel to the hook bend.

There are also variations in shank curvature. See FIG. 5. The shank is the leg of a hook that extends from the bend up to the eye. Hook shanks are manufactured in many different shapes. The most commonly used are the straight shank, curved shank and sliced shank. Shanks are often curved for specific reasons, e.g. to accommodate a special fly imitation. Various fly hooks require the shank to be shaped so as to imitate the body of a special insect. The sliced shank has one or more bards along the shank. These are used to anchor baits, such as worms and soft baits.

As mentioned, double fish hooks are known. In the double hook, the hooks are typically set at about 45-120° from each other, rather than being directly opposed (180°). In addition, the hook, barb, bend and shank of each hook portion are typically in a single plane. However, such hooks have the disadvantage that the hook can slide after it is set and tear the fish's mouth under pressure thus becoming dislodged resulting in the loss of the fish.

Although an ingenious ancient invention, fish hooks can always be improved. Thus, what is needed in the art are better fish hooks, preferably double fish hooks that are less likely to pull out of the fish, especially hooks that can be utilized with a slight offset in opposite directions, this would essentially create a wedge as each hook would pull against each other and would be virtually unable to slide when pressure was applied or when a fish tried to dislodge the hook by shaking its head.

SUMMARY OF THE DISCLOSURE

Herein we provide a double fish hook that alleviates one or more disadvantages of the prior art double fish hooks.

The fish hook has an eye at one end of a shank, the opposite end of which bifurcates to form two bends, each bend having a point and an optional barb, wherein the two bends have a first angle therebetween at the bifurcation point, said first angle increasing in size or flaring the closer one gets to each point. Therefore, the beginning of the bifurcation the angle can be quite small, e.g., about preferably by about 5-15°, most preferably by about 10°. As one travels along the bend to the point, the angle between the two hook portions increases, to e.g. 30-90, most preferably about 45°. Thus, the point and barbs flare further apart.

This is to be distinguished from the known kirbed hooks, wherein just the point and barb are angled. In the inventive hook, the bend itself is angled outward, and the points can be further kirbed or not, as desired.

The advantage of the double flared fish hook include the wedge that is created as the two hooks pull in opposite directions which essentially secures both hooks.

As used herein, all fish hook terms are used according to their ordinary meaning, as illustrated in FIG. 1.

A "double fish hook" is a fish hook composed of two single fish hook portions, adjoined or adjacent along the shank.

A "bifurcation point" is that point of a double hook where the bend of each single hook portion begins to separate.

As used herein "flare" means the angle of separation of the bend is increasing towards the point/barb.

As used herein, "finish" refers to any surface treatment of the completed fish hook. The term is used in its broadest sense to include coatings, paints, milling, grinding, sanding, polishing, electroplating, acid, heat or chemical treatments, and the like.

As used herein color includes both wavelength and intensity, thus, different colors may have the same wavelength (e.g., blue), but have differing degrees of intensity or reflectiveness. Thus light blue differs from a dark blue, which differs from a metallic blue or a glitter blue, even if all colors have the same frequency of blue.

As used herein, a "color finish" refers to any finish that results in a color and/or reflectiveness differing from the metal underneath, including flat colors, metallic colors, pearlescent colors, or glitter.

As used herein a "differentially reflective finish" is one that differentially reflects light (e.g., light bounced off at different angles), to effect a bit of glitter. Such can be achieved with glitter coatings, but also with grinding or etching the metal surfaces. For example, a diamond grinder can provide a multiplicity of small edges on the surface that differentially reflect light, providing a bit of glitter to catch a fishes eye.

As used herein, "glitter" means shining with a plurality of points of light, e.g., having a large number of tiny reflective surfaces. A variety of glitter paints or coatings can be used in coating a hook, or glitter can be applied with adhesive and clear coated.

"Pearlescent" means having a luster resembling that of mother-of-pearl, aka nacreous, iridescent. Exemplary pearlescent coatings include various commercially available pigments or sugar beads or glass glitter applied with adhesive and clear coated.

"Metallic" means having a luster similar to metals, and coatings are available with metallic sheen.

The differences between pearlescent, metallic and glitter finishes are easy to identify, but difficult to define. However, pearlescent materials spread the reflected light into a prism of colors, whereas the other two do not. Glitter versus metallic is a difference in size of the reflective surfaces, metallic finishes having much smaller reflective surfaces than glitter.

The flared double fish hook described here can be used with any desired material, point style, barb style, eye style, and can be bent wire or forged or otherwise. O'Shaughnessy style hooks may be particularly preferred. Particularly preferred materials include stainless steel, martensitic stainless steel containing nickel, high-carbon steel wire, Duratin, coated steels, and the like.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements, such as coatings, packaging, instructions for use, and the like, that do not substantially change the nature of the invention.

DESCRIPTION OF EMBODIMENTS OF THE INVENTION

Figure 1:
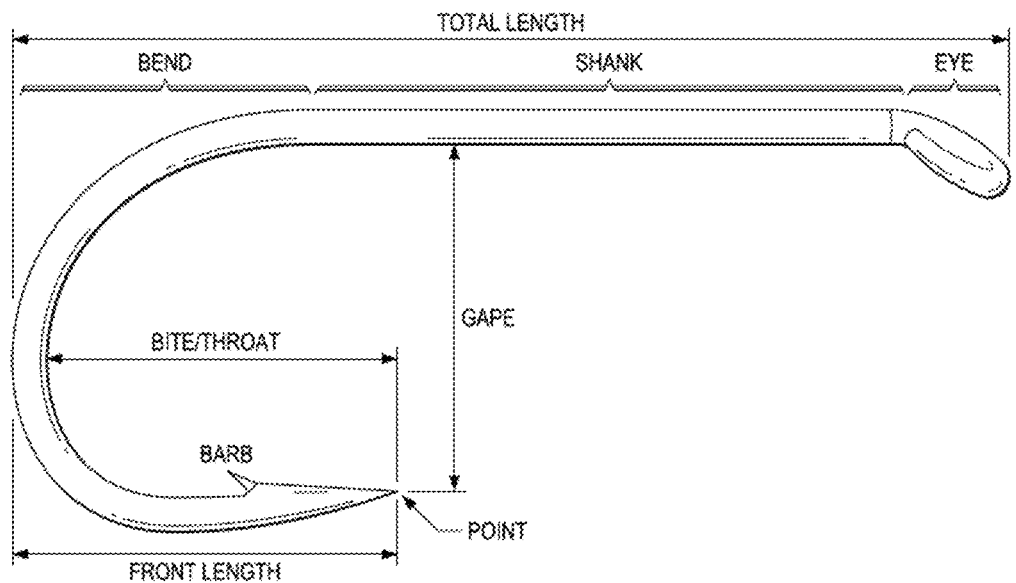
FIG. 1. Parts of a fish hook.
Figure 2:
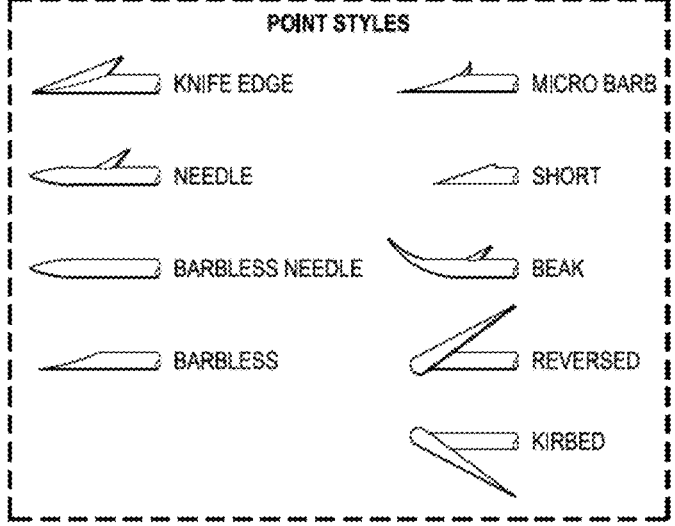
FIG. 2. Point styles.
Figure 3:
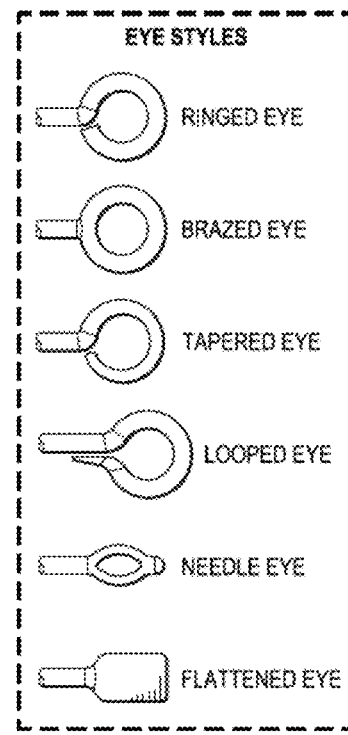
FIG. 3. Eye styles.
Figure 4:
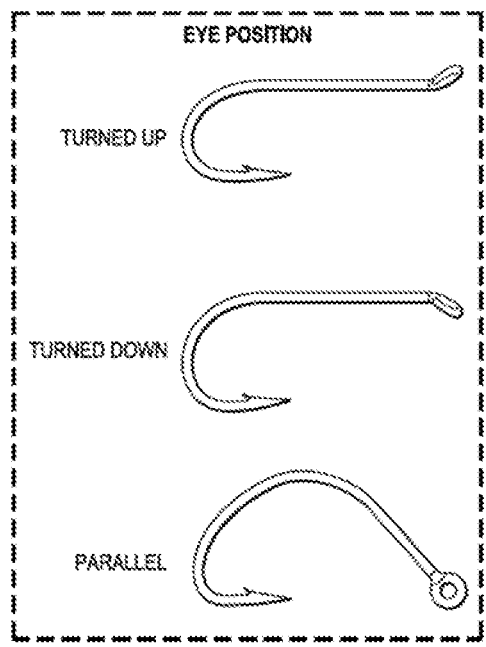
FIG. 4. Common eye positions.
Figure 5:
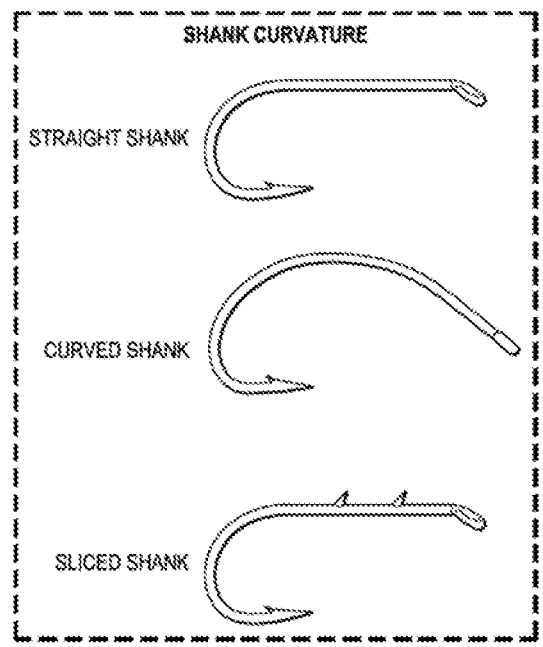
FIG. 5. Shank curvature.

The invention provides a novel flared double fish hook, useful for big game fishing, such as tuna, wahoo, and the like.

The flared double fish hook comprises a pair of shanks, said pair of shanks adjacent one another up to a bifurcation point. The shanks bifurcate at the bifurcation point to each form a bend ending in a point, as is seen in a typical double fish hook. The portions are separated by a first angle at the bifurcation point, and a second angle at the points, said first angle being smaller than said second angle by at least 25°. The angle between the bend portions of the two fish hooks can increase linearly to the points, or can increase exponentially to the point, as desired. In preferred embodiments, the angle increases from about 10° to about 45°.

In use, somewhat higher force is required to set this fish hook, but because the points are flared apart, the large game fish have a more difficult time pulling free of the flared points. The flared points create a wedge that is much harder for the fish to dislodge once embedded.

In another embodiment, an improved double fish hook is provided. In the standard double fish hook, each hook has a shank attached to a bend and ending in a point, two fish hooks being adjacent or even adjoined along said shanks up to a bifurcation point. The two fish hooks are separated by an angle at a bifurcation point near said bends and separated by the same angle at the points—in other words, each hook portion lies in a single plane. The improvement comprises flaring the angle of separation between the two fish hooks, such that an angle of separation increases from the bifurcation point to a larger angle at said points.

Another embodiment provides a flared double fish hook, comprising two fish hooks having a common eye, and adjacent shanks until a bifurcation point, and each fish hook having a bend, a point and a barb, said bend being separated by a first angle at said bifurcation point and said points being separated by a second larger angle at said points.

Yet another embodiment provides a flared double fish hook, comprising means for receiving fishing line; shank means extending from said means for receiving fishing line to a bifurcation point; a pair of bent sections integrally formed with said shank means at said bifurcation point; each of said bent sections ending in penetrating points; said bent sections increasingly flared away from each other from said bifurcation point to said penetrating points.

In manufacturing, straight lengths of wire are cut into pieces of an appropriate length. A point is honed on each end and the wire bent in half over a small cam, forming the eye in the middle. This can be left inline, or bent up or down as desired, but typically is straight. If desired, the shanks can be flattened or brazed together.

Each point is then bent over another cam, forming the bend, with an appropriate throat length and gape. Up to this point, manufacturing has proceeded according to the methods used to make the traditional double hook, but at this point the method differs. Each double hook is then further bent, typically over a larger cam, to move the points away from each other, thus producing the flare. It may also be possible to change the orders of these steps, but the above is typical.

To strengthen the metal, the hooks are tempered or heat-treated. This is an important stage of hook making. The tempering molecularly alters the metal, concentrating the carbon and removing impurities, making the hook much stronger. The hooks are then carefully cooled and intermittently dipped in oil. Once cool, the carbon-steel hook is ready to be plated, although stainless hooks do not have to be coated.

Coatings vary from bronze varieties—which offer little corrosion resistance—to corrosion resistant coatings that contain more protective elements like nickel, zinc and tin. Most manufacturers offer proprietary finishes, such as Eagle Claw's new Platinum+coating, specifically for the rigors of salt water, the black-nickel finish from Spro Corp., and red coatings can also be beneficial, as they are suggestive of blood, which can attract big game fish. However, other than red, no attempts have been made to make the hook itself more attractive or to blend the hook with lure colors/designs. Instead, lure and flies are used for that purpose, since these add-ons are species specific, whereas hooks are generally used for a broad range of species.

Figure 6A:
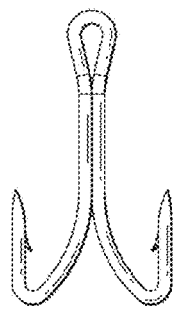
FIG. 6A-6C. Prior art double hook, front view (top panel); side view (middle panel); bottom view (bottom panel).
Figure 6D:
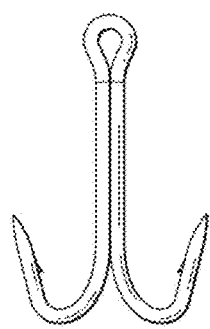
FIG. 6D-6F. Inventive double hook, front view (top panel); side view (middle panel); bottom view (bottom panel).
Figure 6B:
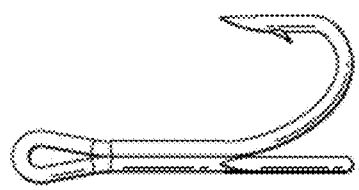
Figure 6E:
Figure 6C:
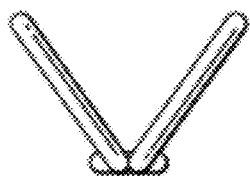

FIG. 6A-C shows the prior art double fish hooks, wherein the bent portions of the hooks lie in a single plane. This can most easily be seen in the side view (middle panel), wherein the point lines up directly in front of the shank. It can also be seen in the bottom view (bottom panel), wherein at the correct angle, the points cannot be seen at all because they lie directly behind the bend.

Figure 6F:
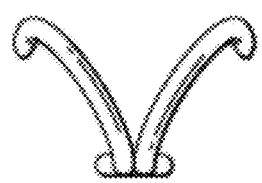

In contrast, in FIG. 6D-F, the flared double fish hook is illustrated, wherein the point does not line up with the shank because the hook increasingly flares from at or near the bifurcation point towards the point. The flare is best viewed from the bottom (bottom panel), where the angle between the two bend portions increases linearly from the bifurcation point to the points, thus providing the curved triangle between them.

From the bottom, the prior art double fish hook shows a straight edge triangle formed between the two bent portions of the two hooks. In contrast, the shape between the two bent portions of the two flared hooks is a curved triangle—e.g., each side of the triangle is an arc (negatively curved triangle).

Figure 7:
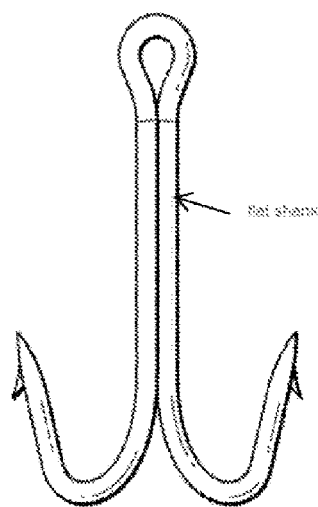
FIG. 7. Inventive double hook with kirbed and reversed barbs.

FIG. 7B shows a variant with kirbed and reversed points.

If desired, the flared double fish hook can be provided with a weed guard (see e.g., U.S. Pat. Nos. 6,253,485, 3,670,446); or a second eyelet (US20080066370).

Figure 8:
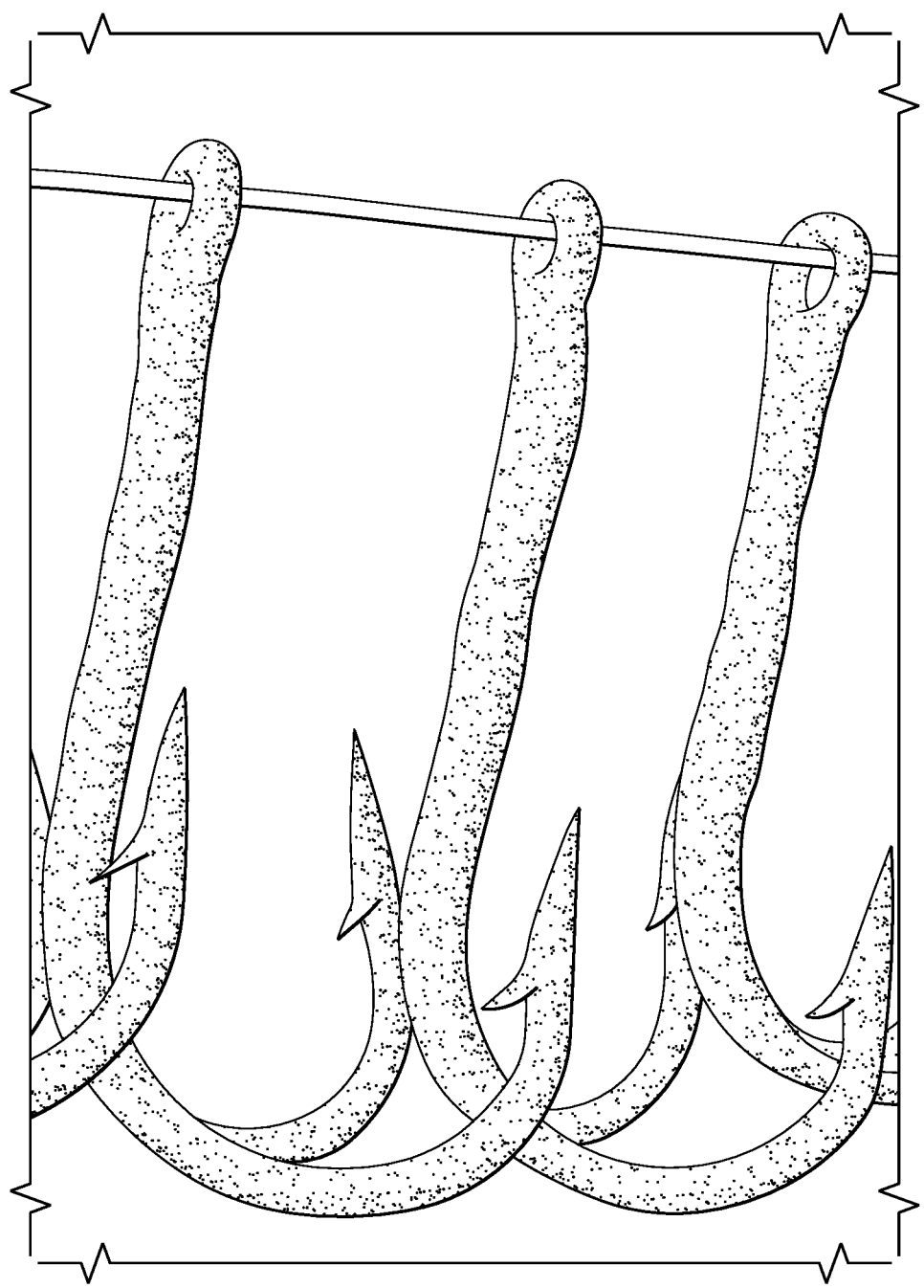
FIG. 8. Glitter coating on fish hooks.

FIG. 8 shows 3 flared double fish hooks with a glitter finish. This finish was applied by a 4-step paint process, first applying a rust inhibiting primer, then a flat paint color, a glitter paint layer, followed by a clear coat for protection. Although not shown, the use of a glitter finish such as this can be combined with any fish hook style, including all of the variants discussed and illustrated herein. Furthermore, any color, be it flat, metallic, pearlescent, glitter, or combinations thereof, can be applied as a finish. The finish can also be specially designed so that the hook blends with a particular lure type.

Furthermore, although we did this proof of concept hook by painting, other means of achieving glitter and/or color finishes are possible. For example, anodizing, plating, electroplating, acid treatments, patinas, powder coating, heat treatments, and the like can also be used to provide various finishes. A glitter like finish can also be provided by grinding or milling the surface of the hook, providing refracting surfaces that will differentially catch and reflect light.

Where a paint or glaze or other coating is used, a primer is generally recommended, although not all metal surfaces require a primer. If the metal does not require primer, such as stainless steel, it means it already contains properties that allow it to prevent oxidation. Rust inhibitor primers such as those made by the Rust-Oleum company prevent oxidation by adding zinc to the primer, which oxidizes in place of the metal. The zinc will have to dissolve entirely before the base metal begins oxidizing, a process that takes years.

In some embodiments, the clear coat can be either omitted or one or more clear coats can be added. In other embodiments, the various paint layers can be combined or omitted, depending on the paint qualities. Thus, where the glitter itself has the requisite color, a color undercoat may be omitted. Further, some paints are formulated with rust inhibitors and to fill microscopic gaps in the metal and stick to it. If so, a separate primer layer may not be needed.

Yet another variation on finishes includes the use of patinas. Patinas are created by treating metal surfaces with chemical solutions, many of which are commercially available for a variety of metals. Rainbow patinas may be particularly attractive to fish Typically, clear coat after patina treatment helps to extend the life of the color.

Hot dip galvanizing is generally accomplished by two methods, both of which immerse or coat the metal with a liquid zinc bath after various processes. This protective coating is the interdiffusion of zinc and iron and will last for many years. However, the fish hook should be fabricated first, galvanized second. Galvanized metals can then be painted. U.S. Pat. No. 5,641,543, for example, describes the "Colorgalv" process allowing one to successfully paint hot dip galvanized products in a wide range of colors. Other coloring processes are available to color galvanized surfaces.

Anodizing is an electrochemical process that forms a protective coating of aluminum oxide on the surface of aluminum. Aluminum oxide is a hard, durable, weather resistant substance. The coating is integral to the metal and cannot peel or flake. The coating may be colored by dyeing or may exhibit bronze tones through diffraction phenomena produced by the coating. Anodizing is only appropriate on certain aluminum alloys. Bronze anodizing is also available.

The invention includes any one or more of the following embodiments, in any combination(s) thereof:

A flared double fish hook comprising: a pair of shanks, said pair of shanks adjacent one another up to a bifurcation point; said shanks bifurcating at said bifurcation point to each form bends ending in points; said shanks being separated by an first angle at said bifurcation point, and a second angle at said points, said first angle being smaller than said second angle by at least 25°.

Any fish hook herein described, further comprising an eye at an end opposite said points.

Any fish hook herein described, further comprising a flattened end at an end opposite said points.

Any fish hook herein described, where the shanks are adjoined up to said bifurcation point.

Any fish hook herein described, where the shanks are brazed together up to the bifurcation point.

Any fish hook herein described, where the shanks are flattened.

Any fish hook herein described, where the first angle is 5-15°, and the second angle is 30-90°.

Any fish hook herein described, where the first angle is about 10°, and the second angle is about 45°.

Any fish hook herein described, that comprises stainless steel, carbon steel, carbon steel coated with a corrosion resistant coating.

Any fish hook herein described, where the steel is tempered.

A method of manufacturing a flared double fish hook comprising: cutting a wire to a length, said wire length having a first end opposite a second end and a middle therebetween; folding said wire length in half at said middle such that a portion of said wire is adjacent another portion of said wire; forming an eye at said middle; bending each end of said wire at a bifurcation point to form a bend, the wires being separated by an angle of at least 5° at said bifurcation point; sharpening said first end and said second end to form a first point and a second point; bending said points away from each other such that said wire flares from at or near said bifurcation point to a larger angle at said first end and said second end.

Any method of manufacturing a flared double fish hook, further comprising adding a first barb by notching the wire near said first point and adding a second barb by notching the wire near the second point.

Any method of manufacturing a flared double fish hook, further comprising brazing the adjacent wires such that they are adjoined.

Any method of manufacturing a flared double fish hook, further comprising heat tempering the wire.

Any method of manufacturing a flared double fish hook, further comprising coating the wire with a corrosion resistant coating.

A improved double fish hook, comprising two fish hooks, each hook comprising a shank attached to a bend and ending in a point, said two fish hooks adjoined along said shanks, said two fish hooks separated by an angle at a bifurcation point near said bends and separated by said angle at the points, the improvement comprising flaring an angle of separation between said two fish hooks, such that an angle of separation increases from said bifurcation point to a larger angle at said points.

Any improved double fish hook, wherein the angle of separation increases linearly or exponentially.

Any improved double fish hook, wherein the shanks share an eye at an end opposite said points.

A flared double fish hook, comprising two fish hooks having a common eye, and adjacent shanks until a bifurcation point, and each fish hook having a bend, a point and a barb, said bend being separated by a first angle at said bifurcation point and said points being separated by a second larger angle at said points.

A flared double fish hook, comprising: means for receiving fishing line; shank means extending from said means for receiving to a bifurcation point; a pair of bent sections integrally formed with said shank means at said bifurcation point; each of said bent sections ending in points; said bent sections increasingly flared away from each other from said bifurcation point to said points.

Any fish hook herein described, wherein said fish hook has a color finish, especially a glitter finish or rainbow patina.

An improved fish hook, a fish hook having a means for receiving fishing line and a bent section ending in a penetrating hook, with a shank connecting said means for receiving fishing line to said bent section, the improvement comprising a non-red color or refractive finish on said fish hook that differs from the color of the metal of the hook and/or differentially reflects light. In particular, glitter coatings, rainbow patina, and etched/ground surfaces may be preferred.

The present invention is exemplified with respect to steel fish hooks, and a simple knife edge point. However, this is exemplary only, and the invention can be broadly applied to any material, point style, eye style, shank curvature, and the like. The examples herein are intended to be illustrative only, and not unduly limit the scope of the appended claims.

The following references are incorporated by reference in their entirety for all purposes.

U.S. Pat. No. 6,253,485
U.S. Pat. No. 3,670,446
US20080066370.

What is claimed is:

1. A flared double fish hook, comprising:
   a) means for receiving fishing line;
   b) shank means extending from said means for receiving fishing line to a bifurcation point;
   c) a pair of bent sections separated by an angle, and integrally formed with said shank means at said bifurcation point;
   d) each of said bent sections ending in points;
   e) said bent sections increasingly flared to curve away from each other such that said angle increases continuously from said bifurcation point to said points such that each of said bent sections does not lie in a single plane.

2. The fish hook of claim 1, wherein said fish hook has a color finish or a differentially refractive finish or a glitter finish.

3. An improved double fish hook, comprising only two fish hooks, each of said only two fish hooks comprising a shank attached to a bend portion including a bend and ending in a point, said two fish hooks adjoined along said shanks, said two fish hooks separated by a first angle at a bifurcation point near said bends and separated by a second angle at the points, the improvement comprising increasingly flaring an angle of separation between said bend portions of said two fish hooks, such that said angle of separation increases continuously from said bifurcation point to said second angle at said points which is larger than said first angle at said bifurcation point near said bends and said bend portions curve away from each other from said bifurcation point to said points such that each of said bend portions is not lying in a single plane.

4. The hook of claim 3, wherein said angle of separation increases linearly.

5. The hook of claim 3, wherein said angle of separation increases exponentially.

6. The hook of claim 3, said shanks sharing an eye at an end of said double fish hook opposite said points.

7. A flared double fish hook consisting essentially of:
   a) a pair of shanks, said pair of shanks adjacent one another up to a bifurcation point;
   b) said shanks bifurcating at said bifurcation point to form two fish hooks having bends ending in points;
   c) said fishhooks curve away from each other and being separated by an increasingly flared angle that continuously increases from said bifurcation point to said points, such that each of said bends does not lie in a single plane and a first angle at said bifurcation point is smaller than a second angle at said points by at least 25°.

8. The hook of claim 7, further comprising an eye at an end of said flared double fish hook opposite said points.

9. The hook of claim 7, further comprising a flattened end at an end of said flared double fish hook opposite said points.

10. The hook of claim 7, said shanks being adjoined up to said bifurcation point.

11. The hook of claim 7, said shanks being brazed together up to said bifurcation point.

12. The hook of claim 7, said shanks being flattened.

13. The hook of claim 7, said first angle being 5-15°, said second angle being 30-90°.

14. The hook of claim 7, said first angle being about 10°, said second angle being about 45°.

15. The hook of claim 7, comprising tempered stainless steel or tempered carbon steel or tempered carbon steel coated with a corrosion resistant coating.

16. The fish hook of claim 7, wherein said fish hook has a color finish or a differentially refractive finish or a glitter finish.

17. A flared double fish hook, comprising only two fish hooks having a common eye, and adjacent adjoined shanks until a bifurcation point, and each of said only two fish hooks having a bend portion ending in a point and a barb, said bend portions curving away from each other from said bifurcation point to said respective points and being separated by a first angle at said bifurcation point, an angle of separation increasing from said bifurcation point to a second angle between said points which is larger than said first angle at said bifurcation point such that each of said bend portions is not lying in a single plane.

* * * * *